United States Patent [19]

Bottinger

[11] Patent Number: 5,666,793

[45] Date of Patent: Sep. 16, 1997

[54] COMBINE OPERATION WITH OPERATING DATA REGISTER

[75] Inventor: Stefan Bottinger, Steinhagen, Germany

[73] Assignee: Claas oHG Beschrankt haftende offene Handelsgesellschaft, Harsewinkel, Germany

[21] Appl. No.: 523,333

[22] Filed: Sep. 5, 1995

[30] Foreign Application Priority Data

Sep. 7, 1994 [DE] Germany .................. 44 31 824.3

[51] Int. Cl.⁶ .............. A01D 41/12; A01F 12/00
[52] U.S. Cl. .............. 56/10.2 R; 56/10.2 A; 56/DIG. 15; 460/1
[58] Field of Search .............. 56/10.2 R, DIG. 15, 56/DIG. 2, 14.6, 10.2 A, 10.2 B, 10.2 C, 10.2 D; 460/1, 149, 150; 364/488

[56] References Cited

U.S. PATENT DOCUMENTS 5,463,854  11/1995  Chmielewski, Jr. et al. ....... 56/10.2 E

FOREIGN PATENT DOCUMENTS 42 23 585 A1  1/1994  Germany .
1605036       5/1978  United Kingdom .
2 155 666 A   9/1985  United Kingdom .
WO86/05353    9/1986  WIPO .

*Primary Examiner*—Terry Lee Melius
*Attorney, Agent, or Firm*—Browdy and Neimark

[57] ABSTRACT

A method for operating a combine which, for optimizing the harvesting output, is continuously externally controlled by an operator via a control processor (ST) containing set-point and/or limit operating data and is internally controlled by means of continuous measuring and evaluation of actual operating data (VI, SBI, SHI), in particular traveling data, wherein the absolute and/or relative location coordinates (X, Y) of the combine are continuously detected and, assigned to them, the respective area-specific yield measuring data (EM) are stored, in particular in the form of a yield data register (EK) to be used as a historical data register (HK), wherein the control processor (ST) of the combine has access to a historical data register (HK) and addresses them, in each case prior to the actual coordinates, with the respective location coordinates (X, Y) of the combine, linked with its respective travel data (VI, SBI, SHI) and historical data (DH) stored there, reads them and from them determines fresh set-point or limit operating data (VS, SBS, SHS) and actually specifies them.

17 Claims, 6 Drawing Sheets

COMBINE OPERATION WITH OPERATING DATA REGISTER

The invention relates to a method for operating a combine which, for optimizing the harvesting output, is continuously externally controlled by an operator via a control processor containing set-point and/or limit operating data and is internally controlled by means of continuous measuring and evaluation of actual operating data, in particular traveling data, wherein the absolute and/or relative location coordinates of the combine are continuously detected and, assigned to them, the respective area-specific yield measuring data are stored, in particular in the form of a yield data register to be used as a historical data register.

Such a combine is known from WO86/05353. Its path measurement signals and/or radio locating signals are continuously recorded and a current register of the specific measured yield data is prepared and assigned to them. This yield register is used for the subsequent determination of optimal use of fertilizer or pest control materials and/or the control of a sowing machine or a soil cultivating machine in order to distribute the seed or to control the cultivation intensity to attain the specific yield which reflects the type and structure of the soil.

Furthermore, a device for distributing agricultural material is known from DE 42 23 585 A1, whose control is performed by means of field contours maintained in a border register and a radio locating device, so that the material is distributed only inside the contour and close to it. It is also provided to show the course of the contours and the location of the distributing device to the operator on a display screen.

A combine of the above designated type is furthermore described in DE P 43 41 834.1 of Applicant, which includes a processor-operated control and regulating device which results in optimal harvest operation by means of an interactive operator control and which continuously provides the operator with set-point, limit and actual operating data in display masks in the form of pictograms and in alphanumeric display fields and which also prepares a harvest register for subsequent use.

The object of the invention is to produce further relief for the combine driver and, if different crop conditions or types are encountered in a field, to achieve an even greater optimization of the harvest operation by means of attaining a large throughput with a relatively low area-specific harvest loss, and to prevent cases of overload and damage to the machinery.

This object is attained in that the control processor of the combine has access to a historical data register and addresses and reads historical data which are stored there by means of the respective location coordinate data of the combine, linked with its travel data and anticipating the actual coordinates, and from this determines and actually provides new set-point or limit operating data.

Advantageous embodiments are recited in the dependent claims.

The essential principle consists in that the register data from previous combine passages in previous years or from passages through adjacent lanes are used as the basis for obtaining the set-point and/or limit values, by means of which a control optimization is achieved by anticipatorily evaluating the data in such a way that an adaptation to the operating conditions takes place already before a critical field area has been reached in which there is, for example, a denser stand, or the crop lies in an unfavorable direction or the inclination of the terrain changes, so that an overload or damage to the threshing or mowing units in particular is prevented. In the course of this the speed is reduced, in particular if harvesting had taken place at high speed in a thin stand or, if the inclination or undulations of the ground change, the cutter unit inclination control and/or the cutting height control are provided with fresh set-point or limit data.

It is necessary, for one, for an as exact as possible specification of the operating values to evaluate the registered data regarding the actual location where they were taken, i.e. corrected by the distance the combine travels during the period from cutting the crop until the respective measured value is obtained and, on the other hand, to take into consideration the control time constant of the respective setting device, i.e. that the coordinates of the register access are advanced to correspond to the distance the combine has traveled during the control time constant, if the new setting is apt to cause damage, for example results in higher speed or a reduced cutting height.

To the extent that the operating set-point or limit data determined from the historical data are not directly passed on to a controller and instead are provided to an operator for setting by visualization, his reaction time must also be taken into consideration.

A further look ahead regarding the establishment of the set-point and limit data is provided, if the basis is a partial register of the last adjoining lanes instead of a full register, by performing an analysis of the data changes respectively in front of and behind the adjoining lane areas in connection with an oblique extent of a ground or harvest change in respect to the direction of the lane, and by accordingly making an extrapolation in connection with the respective combine location relevant for the use of the data, taking into consideration the control time constants and the traveled distance connected therewith as well as the possible damage which could be caused by the intended setting. By means of this the operating values are automatically adjusted to a crop change course which extends obliquely to the direction of travel, i.e. a fertility boundary extending obliquely to the direction of travel; such an operating setting often is not easily possible for the driver because of his lack of an observation possibility, since the distances travelled until a measured value is obtained and the further distance until the final machine setting respectively are approximately 50 m.

In an advantageous manner not only the area specific crop amounts are recorded in the register as operating data, but also the relative crop losses and the amounts of straw throughput and possibly also the set-point and limit values of the operating data.

It is possible in this way to select an operating control in accordance with various criteria, for example high throughput or small crop or straw losses. The operating limit and set-point data are advantageously selectively provided directly to the control device or displayed to the driver in his cab. In any case, for safety reasons the driver is provided with a manual override option, so that he can reduce the speed or stop the combine and also raise the cutter unit in order to avoid obstacles or overloads.

It is of course also possible to specify set-point values of the combine other than the speed, the cutting width and cutting height on the basis of register data, such as the drum rpm, the fan rpm, the rpm of the draw-in worm, the elevator speed and the screen setting. In the course of this it is necessary to respectively take into consideration the associated passage times of the crop up to the measuring point and the setting times of the device for override steps, as analogously shown in the examples.

A particularly memory-saving registration is achieved in that a coordinate pair is respectively stored only if an operating data item which is to be stored has changed by a specified relative or absolute amount. This type of storage also makes the extrapolation of operating data changes from the adjacent lanes into the current traveling location easier, since the stored data are associated with the larger operating data changes and the stored coordinate differences between the points of similar changes in the operating data in the adjacent harvested lanes must be transferred to the currently worked lane and for this purpose the associated operating data must simply be transferred.

The location coordinates of adjoining lanes are respectively referred to a starting point, so that even with a path-dependent coordinate type, memorization takes place independently of the direction of travel of the combine and relating to the respective actual location.

The aim in connection with combines is to achieve a maximal throughput rate with still acceptable crop losses or to maintain a throughput rate which the driver considers to be advantageous. The setting of the work members of the combine is adapted to this throughput rate in order to obtain an optimal work result in this way. In a combine traveling at a constant speed, continuously changing densities of the stand have a direct effect on changes in the throughput rate. In order to obtain a constant throughput rate and/or setting of the work members of the combine, the speed and/or the setting of the work members of the combine must be controlled or adjusted. Various throughput measuring devices for combines have been developed for this purpose. Considerable increases in output, for example, have been achieved by means of control devices based on this. It is disadvantageous in this connection that the crop throughput can only be measured when the crop is already in the combine. Therefore only variations in the amounts over long cycles could be addressed.

This disadvantage of the previous belated control is removed by the anticipatory evaluation of the historical data. However, the known optimizing strategies of the belated control can be advantageously retained in a subordinate control loop.

Operating data registered in the previous year are respectively put into relation with the actual data and are proportionally adapted to them.

If several combines work in one field, only one machine will require a throughput measuring process and the capability of correcting the existing field map. These corrections can be passed on to the other combines in the field, which do not absolutely need to have a throughput measuring method installed, but must have a locating or navigation system.

The correction data processing can also be performed by a stationary computer, for example at the edge of the field. Yield and location data are transmitted to the stationary computer by a combine with a throughput measuring device and a locating or navigation system. The yield correction data are radioed to one or several combines in the field. Location correction data, such as are required for a differential satellite navigation system (DGPS) for example, can be transmitted over this radio link in addition to the yield correction data.

The strategies shown here, which take into consideration the true locations of fertility boundaries, the time constants of the control devices, the data obtained from the adjoining lanes and the danger relevance of the intended corrective control, can be used for every harvesting machine or agricultural work machine wherein one or several machine settings can be controlled as a function of one or several values correlated to fertility difference data or ground data.

Advantageous embodiments are described by means of FIGS. 1 to 7.

Figure 1:
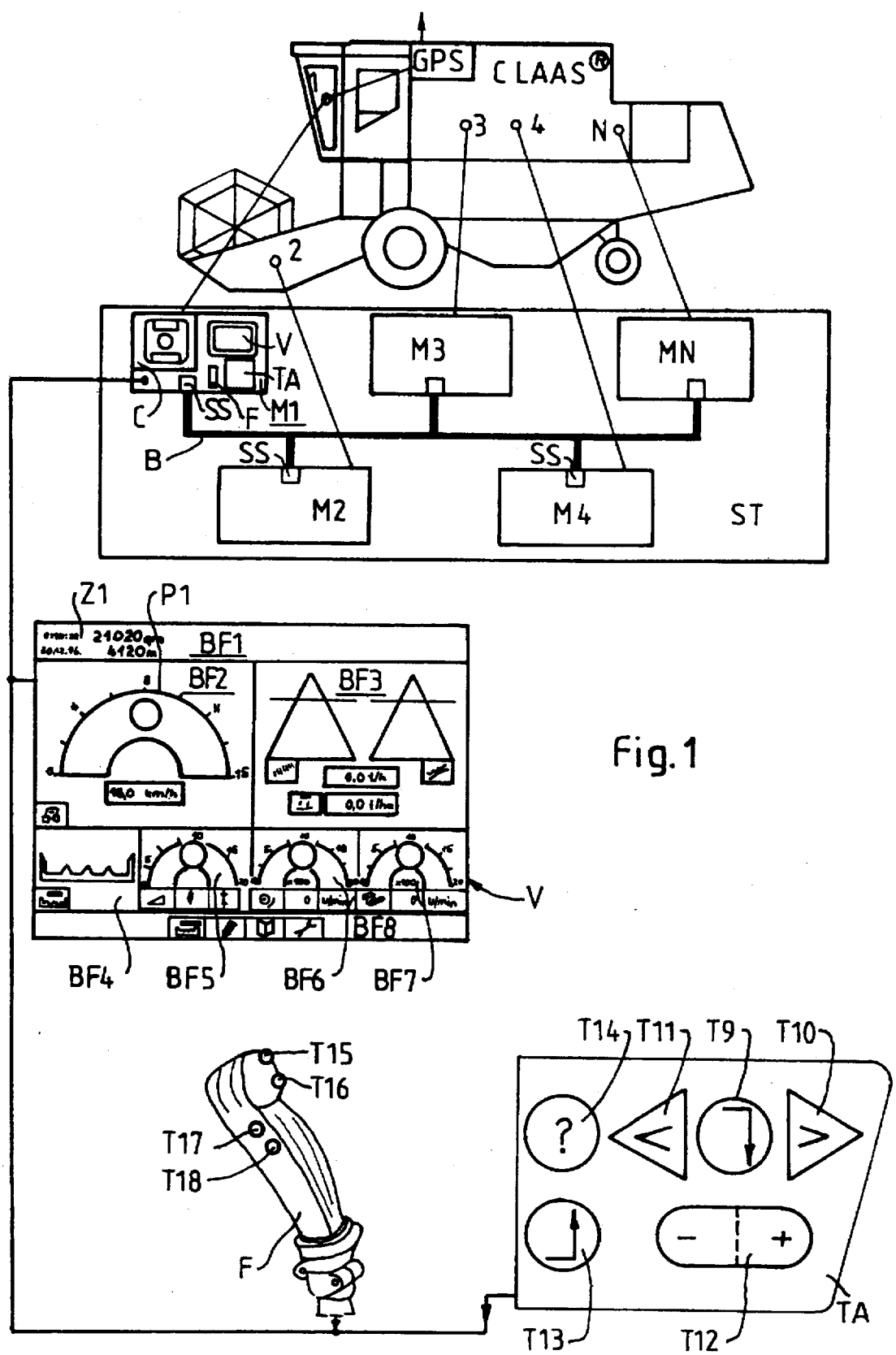
FIG. 1 shows a schematic general plan of a distance with a multi-processor network and detail enlargements in various scales.

FIG. 1 shows a schematic general plan of a combine having a control device (ST) with a microprocessor network with the bus (B). The control station processor (M1) is installed in the cab (1), and a second microprocessor (M2) is installed on the cutting unit (2) for cutting unit control and regulation, a third microprocessor (M3) is installed on the drive and running gear (3), a fourth microprocessor (M4) is installed on the threshing unit (4), a fifth microprocessor (MN) is installed on the feed- and cleaning unit (N), which supervises the flow of material. Each microprocessor (M1 to MN) is connected to the central communications bus (B) via an interface circuit (SS). The control station processor (M1) triggers the screen (V) and is triggered by means of a control keypad (TA) with 7 keys (T9 to T14) for screen dialogue operation as well as by means of cutting unit adjusting buttons (T15 to T18) disposed ergonomically on the control stick (F).

The screen display areas are the time and date display and the area and course information (BF1), the traveling speed display (BF2), the grain loss- and harvesting output display (BF3), the work width (partial width) display (BF4), the cutting height setting unit scale with the display of cutting height set-point values (BF5), the threshing drum rpm display (BF6), the fan rpm display (BF7), and the selection bar for the main menu (BF8). The key functions from the key field (TA) are the confirmation key (T9) for opening menus, for confirming the adjusting unit, and for starting and stopping tasks, the cursor key "right" (T10), the cursor key "left" (T11) for selecting menu items; by using "left", it is possible to navigate from the first menu item to the last item and vice versa; the +/− rocker key (T12) for adjusting values, the escape key (T13) for jumping back to the next higher menu level, and the help key (T14) for calling up explanatory text regarding the actual menu item. Further pressing of this help key leads back to the menu item. If the keys are kept pressed longer, the key function automatically repeats several times. The cutting unit lift pushbutton (T15), pushbutton (T16) for lowering the cutting unit, pushbutton (T17) for turning on the automatic cutting height preselect system, and pushbutton (T18) for turning on the automatic contouring system are arranged on the control stick (F).

The eight display fields (BF1 to BF8) are disposed on the screen (V), in which pictograms (P1) for analog depiction of operating data, numeric data (Z1) for numerical data output, and in other operating states, text data are shown.

The display areas for time display (BF1) and for menu selection display (BF8) are always present in the same way, wherein the time and date are shown, continually updated by the electronic internal clock, and the menu display is effected as a function of the key actuation of the control keypad (TA), by representing the main menu display symbols in solid form if updated and otherwise in transparent form.

Details are shown in the harvest representation, wherein the tachometer is shown on the left and where the grain loss rate and the harvesting capacity are continually shown in two triangular pictograms in the large display field on the right (BF3). The respective working width (SBI), cutting unit height preselection (SHI), threshing drum rpm, fan rpm, and engine rpm with the engine load are shown and numbered in the smaller display fields (BF4 to BF7) underneath.

Respectively the actual measured values (VI, SBI,SHI, S11, S12) and the historical operating data (VS, SBS, SHS, SHS1, SHS2, H31, H32, H6, H7) important for the respective location are displayed in the individual display fields (BF2 to BF7) by means of different and differently arranged display symbols. Thus, in the second display field (BF2) the actual speed (VI) is displayed in the form of a speedometer needle, and the historically determined set-point speed (VS) is displayed outside of the dial.

Furthermore, the instantaneous actual area rocker and screen losses are displayed in a corner of the third display field (BF3) and along with this the historical loss values (H31, H32), which are transformed to the harvest location. It can be seen that the loss rates have been considerably improved over those previously achieved.

The actual and set-point cutting width settings (SHI, SHS) are displayed in the fourth display field (BF4).

The actual cutting height (SHI) and the historically determined set-point cutting height (SHS) are displayed in the fifth display field (BF5), again inside and outside of the dial. Added to this are the limit value indicators (S11, S12) of the cutting height limits actually preselected by the driver and the preselected limit values (SHS1, SHS2), shown hollow on the outside, which have been determined from historical data. Since the preselected limit values are lower than the historical ones, it can be seen that the latter are not brought directly to the controller, but are only used as a guidance aid for the operator, and he tries to find a new, more advantageous setting with lower stubbles. By means of a key selection for the individual display fields it is possible to select a direct or indirect control data specification. Which of the respective limit values have been activated or are merely informative can be seen from the solid or empty representation of the appropriate symbols. The internal control of the cutting height optimization operates within the activated limit values (S11, S12).

Alarms and important reports are represented in the display fields (BF2 to BF7), which can be variably assigned, and which override the displays of actual and set-point operating data. A case of an alarm occurs, among other things, if set-point or limit data have been specified which, on the base of historically determined data, must be considered to entail danger, i.e. the operator has permitted too low a cutting height or too high a speed which could result in damage. For example, an alarm situation would occur if the actual cutting height indication (SHI) would fall below the lower historical limit value (SHS1) in the display field (BFS) of the cutting height indicator.

Alarms are a special form of higher priority reports. They produce an optical and acoustic signal, which must be acknowledged by the operator. The optical signal is comprised of a symbol and explanatory text and overlaps the previous screen content. After an acknowledgement, the alarm appears only as a report.

The actual traveling speed, the path signals and the on or off state of the cutting unit are determined within short periods of time and are evaluated for the location determination and addressing of the register as well as for display and as control values.

Moreover, the following messages are periodically exchanged between the control station processor (M1) and the drive and running gear microprocessor (M3):

Receiving:
  Partial width 1/1–1/4
  Working width
  Static radius x traverse
  Upper engine idling rpm
  Full-load engine rpm
  Minimum working rpm
  Permissible slippage
Sending:
  Cultivated area
  Area yield
  Distance
  Work hours
  Operating hours
  On-board network voltage
  Engine load
  Fan rpm
  Threshing drum rpm.

The latter data are used in particular for the output of harvesting and accounting information as well as for the setting up of a harvesting register for the correlation of grain throughput data, which are determined and periodically sent out by the feed- and cleaning microprocessor (MN), and stored for continuous and accumulated output.

Continuous communication with short reaction times also takes place in particular between the control station microprocessor (M1) and the cutting unit regulator processor (M2), since the signals of the command buttons (T15 to T18) on the control stick (F) must immediately be translated into control actions for setting the height and pitch of the cutting unit, since these are used for the optimal detection of grain of varying heights and/or grain which is at an angle or lying flat and for the prevention of damage to the cutting unit by stones or clumps of soil and, for prevention of an overloading of the feeder, for the respectively specified traveling speed and cutting width, which are determined by the longitudinal or lateral pitch adjustment on the control stick (F).

The following periodic messages in particular are provided for communications on the part of the cutting unit processor (M2):

Receiving:
  Traveling speed
  Incrementation or decrementation of the cutting height,
  Set-point values for the two automatic lowering units,
  Set-point value for the cutting height regulator.
Sending:
  Actual value of the automatic lowering units,
  Actual value of the right and left ground feeler,
  Automatic contour system on-off,
  Set-point values of the automatic lowering units on-off,
  Set-point values of the cutting height regulator on-off.

Furthermore, alarms which signal the exceeding of specified actual value limit values as well as malfunctions of the actuating members and the magnet valves of the hydraulic height and pitch adjusting devices are sent with priority.

The actual values for the cutting height and pitch setting are formed from the bearing pressure (measured at the cutting unit spring) and the ground clearance (measured via feeler) in this way the driver has the capability of smoothly adjusting the optimal bearing pressure and the ground clearance of the cutting unit.

In addition to the height regulation, a lateral regulation is also active so that the cutting unit is guided parallel to the ground and the cutting height is constant over the entire width of the cutting unit. This lateral regulation compares the left and right ground clearance and when there are discrepancies, gives correction signals to the hydraulic system.

The driver has the option of preselecting a cutting unit height of over 100 mm, for example, by means of the automatic lowering unit. The preselected height is automatically set. During travel, the driver can switch back and forth between the automatic lowering unit program and the cutting height regulator program and can thus set different cutting unit heights at the push of a button. These function change-overs are mainly controlled via the buttons on the multi-function handle (F) of the control stick. The upper button (T17) is used to lift the cutting unit up from the automatic contour position range near the ground and into the cutting height range farther from the ground. The lower button (T18) is used to lower the cutting unit into the automatic contour adjustment, which can be in the range of a specified cutting height preselection as well as a specified cutting height regulation. This is decided only when an associated set-point value is adopted which is determined by the operator himself or is continuously specified, determined from the registered data.

Figure 2:
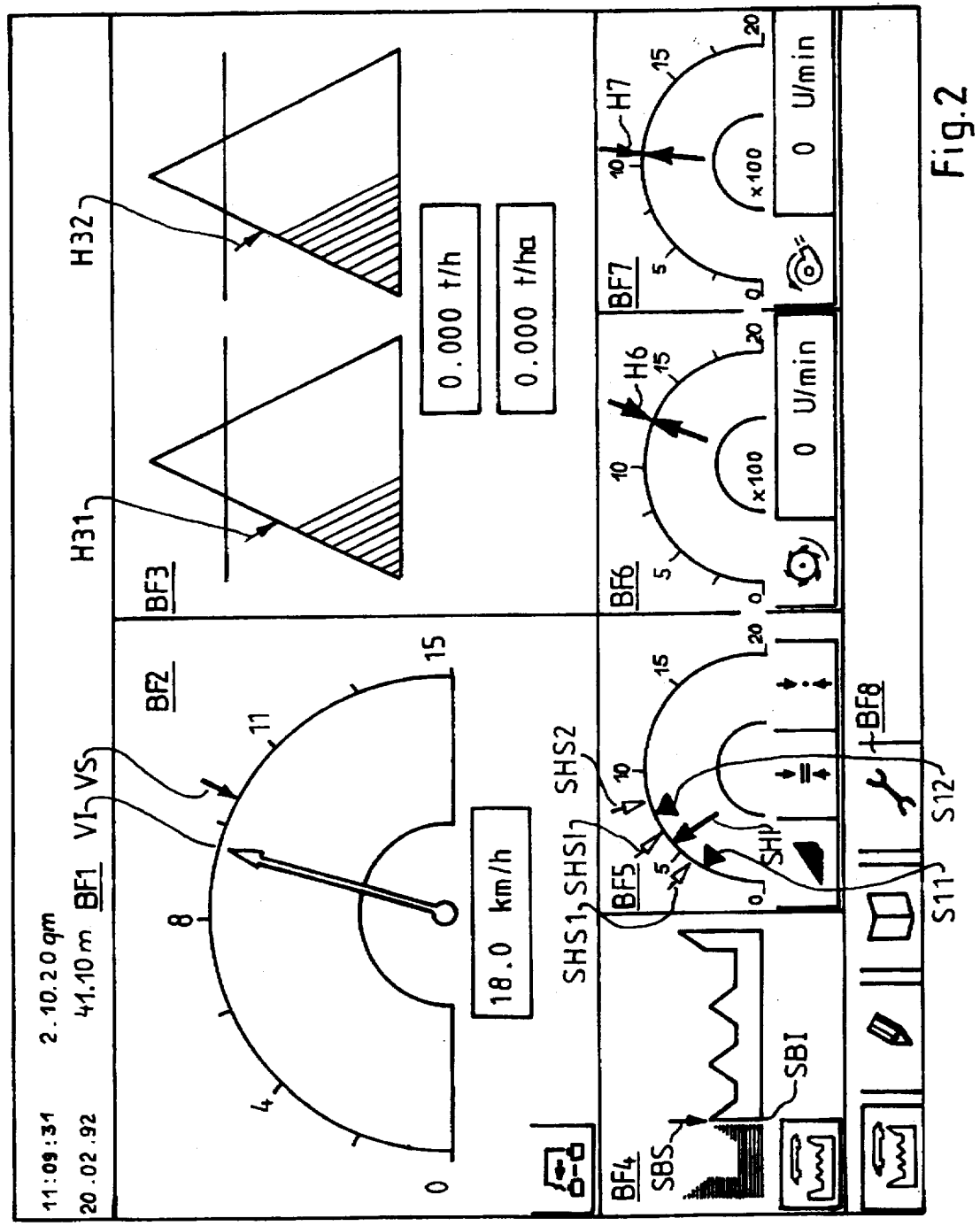
FIG. 2 shows a traveling display mask.

Two types of set-point value inputs are provided. In the first method, the set-point value can be changed by means of the +/− keys (T12) of the keypad (TA). This changing of the set-point value can be set in the work menu. The system supports the input in that the cursor is in the position in accordance with the automatic system that has been preselected by the driver with the button on the multi-function handle (F). The set-point value is incrementally adjusted by small increment widths (2.5%). The execution time is under one second. For this purpose, the terminal sends the message "increment" or "decrement" to the cutting unit microprocessor (M2), which in turn responds with the new set-point value. The calculation of the new set-point value is thus carried out centrally in one location. Specification of the set-point values (S11, S12), FIG. 2, is also possible in the submenu; adjust contour.

The second method makes it possible for the driver to adopt the actual value as the new set-point value. To that end, the cutting unit is brought into the desired position via the raising and lowering buttons (T15, T16), and then, by pressing the corresponding automatic-system button (T17, T18) for a long time (over 3 seconds), the actual value is adopted as the new set-point value. A short actuation of the switch, however, lowers the cutting unit into the automatic position determined by the other set-point value, and the established set-point value is not changed in the process. The decision whether the old set-point value should be retained afterward or the actual value should be adopted as the new set-point value is made only after the release of the switch.

The new manually set set-point and limit operating values are respectively registered for use when traveling through the adjoining lane. In this way it is possible to determine an optimal setting in a few cycles and adopt it for the subsequent cycles.

In the same way standard adjustment values are specified, e.g. set-point and limit values, for the cutting unit regulation, from which the operator can specify a change when there are operating conditions which diverge from the norm, this is also the case for the other subassemblies of the combine. Standard values of weight per liter at an average quality and average moisture for individual types of grain are stored for yield and loss measurement and for the associated calculations, which is why after switching on, the menu-driven selection of the type of grain must be selected. Moreover, externally determined weight per liter data can be input at timed intervals, if there is no automatic weighing system. The data is transmitted into the yield and loss measuring microprocessor (MN) and is used there for the evaluation of measurement data, whereupon the results are continuously transmitted to the control station microprocessor (M1) and are entered there for the continuous output in the harvesting display in the pictogram of the display field (BF3) and are stored temporarily for evaluation and later output to a printer or a cassette (C). The grain loss measuring device also requires the input of the grain type for the sake of correlation of the signals measured; characteristic values are assigned to each grain type and are kept stored in memory.

If a loss value occurs that exceeds a specified limit value despite the regulation-conditional optimizations, an alarm report is given. By means of the conspicuous, very clear depiction of rocker loss in the left triangle and screen loss in the right triangle of the display field (BF3) of the harvesting display mask, FIG. 2, the operator constantly has these important operating criteria in his field of vision so that he can continuously carry out a further optimization through the selection of the respective suitable cutting width, traveling speed adjustment, cutting height adjustment, and optionally screen and fan adjustments.

The ergonomic disposition of the control stick (F) in grasping region of the right hand and that of the keypad (TA) in front of the right hand allows easy access to the stored information and the respecification of operating set-point values, also during continuous operation.

In the control station processor (M1), the processing of the incoming messages into the individual display fields takes place on two different program levels. An arriving message is first handled in an interrupt-controlled background program level as follows:

If there is an alarm according to the identifier, the affiliated message is taken out of the buffer and an alarm marker is set, and the message association to the affiliated alarm display field (BF3) made and noted in a display field memory, the beep is switched on, and the identifier is deleted as well.

If there is no alarm, but rather a report, the message which corresponds to the report is noted in a control field of the report display field area (BF4) and a short beep is initialized and the identifier is deleted as well.

If there is neither an alarm nor a report, and if a new display value has been transmitted, the display variable is entered in the display field control memory affiliated with the respective display value and the identifier is deleted as well.

Further processing of the display field control memory information takes place periodically in a background utility program. The individual display area contents are combined there in a display memory and/or updated, depending upon the status information in the display field control memories.

If there is a change in the status of threshing unit-on, the harvesting display, FIG. 2, is edited; if the new status is threshing unit-off, the traveling display mask is constructed.

If a state of the operating keys (T11 to T18) is changed, the menu status memory is correspondingly updated and the affiliated display field status memories are provided with corresponding entries, or these memories are erased.

If an alarm has been acknowledged by means of actuating a key, the alarm status of the alarm display field (BF3) is deleted in the affiliated display field status area and the beep is switched off.

After that, the new entries contained in the individual display field status memories are hierarchically evaluated on an overriding basis in comparison to alarm entries, report entries, and general operating information, such as new actual and set-point values and menu status changes, to control the changing of the display memory contents so that the display content is fully updated.

Figure 3:
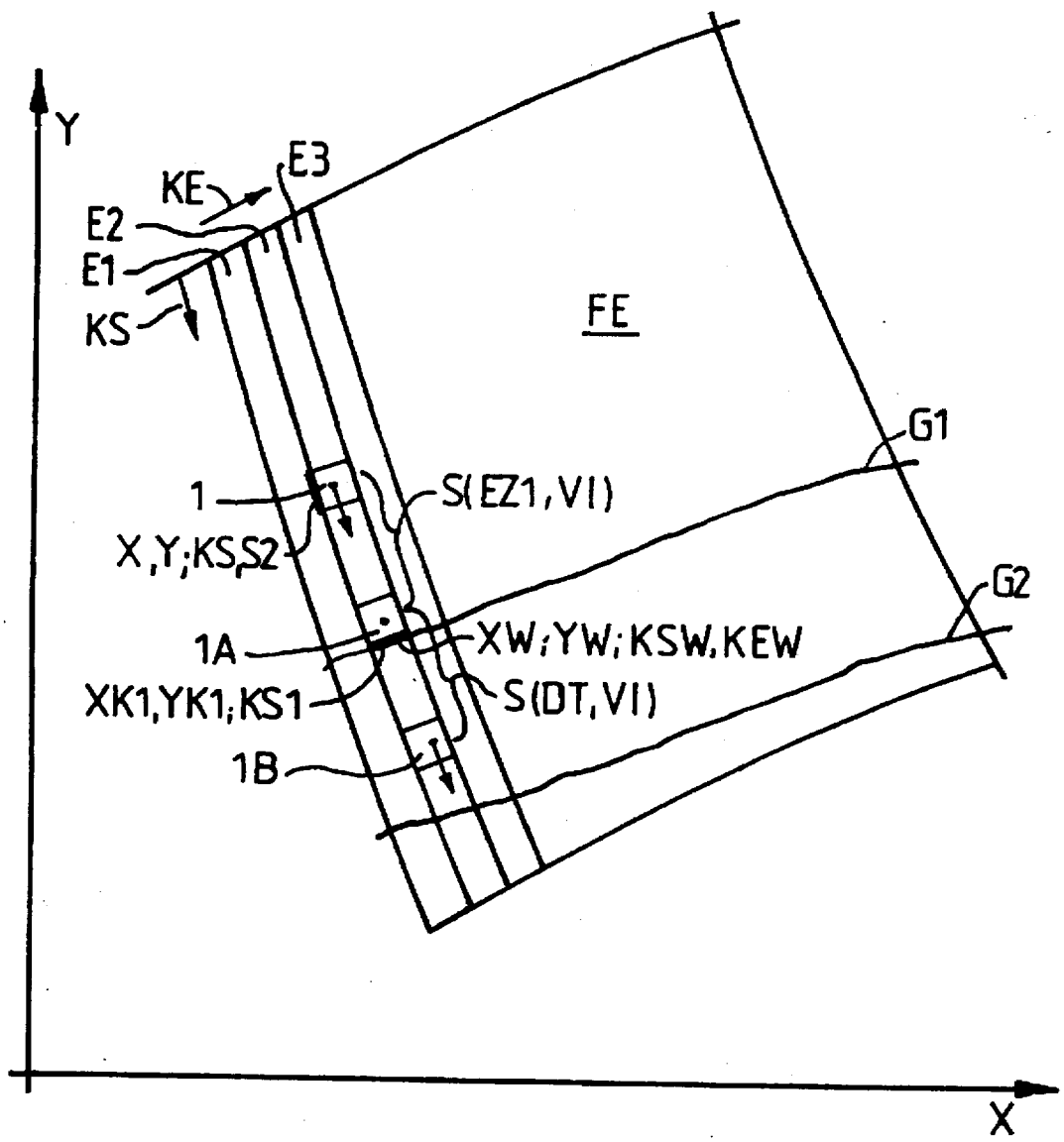
FIG. 3 shows a field map with the actual, future and historical combine locations in an absolute coordinate net.

FIG. 3 shows a field map in an absolute location coordinate net (X, Y). The field (FE) is evaluated in paths or lanes (E1, E2, E3), which lie next to each other in the relative coordinate direction (KE) and extend in the path coordinate direction (KS). If the lanes are traveled in alternating directions, the coordinates are correspondingly evaluated. If, for example, the combine was in the historical location (1B) when measured data were obtained at its output, it was, over the distance S (DT, VI) over which it traveled in the machine travel time (DT) at an actual speed (VI), at the location (1A) with the true coordinates (XW, YW; KSW, KEW) under which the measured data, (operating date) were stored.

During a subsequent harvesting operation, when the combine is in the actual location (1) with the current coordinates (X, Y; KS, E2), these stored operating data are accessed which will be relevant for the machine setting when the combine arrives at the target location (A1) with the coordinates (XK1, YK1: KS1). This target location (A1) lies ahead of the actual location (1) by the distance S(EZ1, VI), which is travelled during the machine set-point time constant (EZ1) at the speed (VI) of the combine.

If there are fertility boundaries (G1, G2) in the field (FE), in which at least a larger resetting of the machine set-point values must be performed for optimal and reliable operation, the respective corresponding input is made effective in good time so that the resetting is respectively just over when the fertility limits (G1, G2) are reached.

Figure 4:
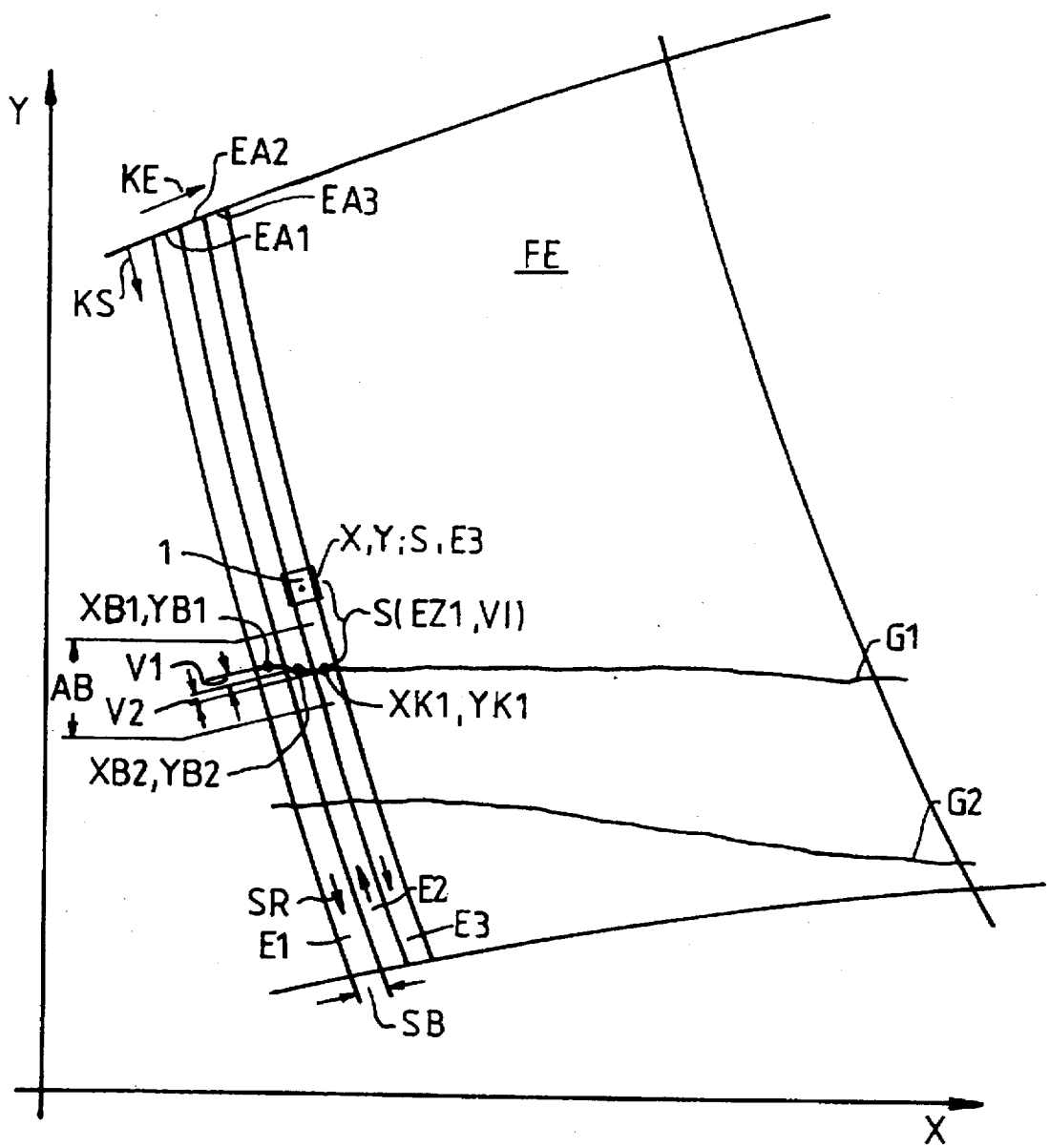
FIG. 4 shows a field map with extrapolation points and path coordinates.

FIG. 4 shows another field map (FE) in the absolute coordinates (X, Y) and with the relative coordinates (KE, KS). The harvesting lanes (E1, E2, E3) with a lane width (SB) are respectively charted in relation to adjoining starting points (EA1 to EA3).

Operating data jumps are stored at the fertility boundary (G1) under the coordinate pair (XB1, YB1) in the first harvesting lane (E1) as well as under the coordinates (XB2, YB2) in the second harvest lane (E2). If the combine is in the actual location (1) under the coordinates (X, Y, E3, S) in the third harvesting lane (E3), the stored operating data are checked for operating data jumps or large operating data changes in an analysis area (AB) located ahead, and the previously mentioned coordinate pairs (XB1, YB1, XB2, YB2) are found and from them their offset (V1) in the direction of travel (SR) is determined and a corresponding offset (V2) is extrapolated in the adjoining harvest lane (E3) and the course of the fertility boundary (G1) is postulated there. When the combine has approached this limit value as far as the distance S(EZ1, VI) which must be traveled in the machine set-point time constant (EZ1) at the speed (VI), the set-point and limit operating data input in accordance with the historical operating values which apply on the other side of the fertility boundary (G1) is performed there already and not only when the fertility boundary (G1) has been reached, if the new setting results increase safety from overload and/or machine damage. If the greater danger of overload lies in the harvest area which will be left, the change is initiated only after the fertility boundary has been reached.

Figure 5:
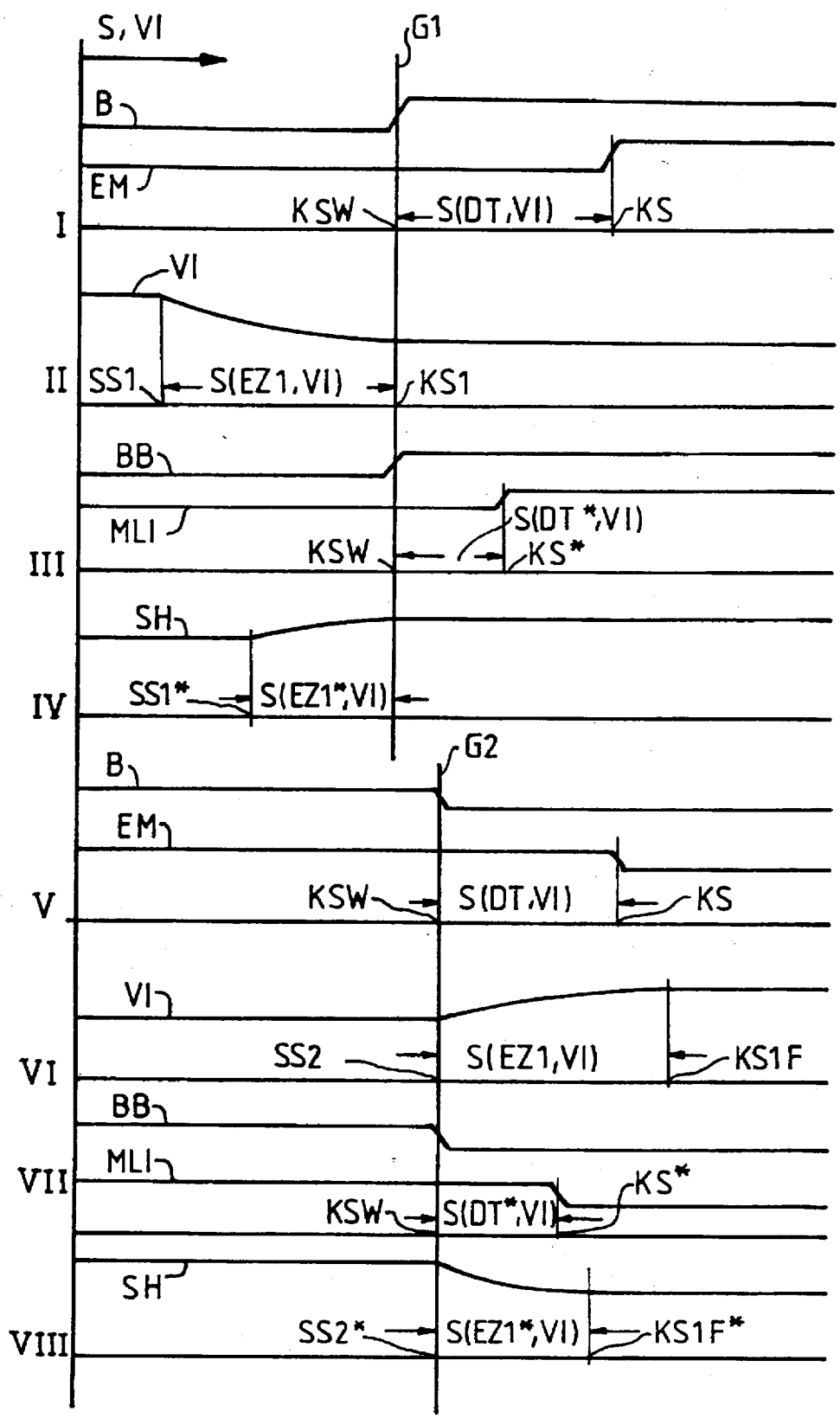
FIG. 5 shows a location scheme of various operating cases.

FIG. 5 explains the connection between the different machine locations and the dependence on the time-relevant values by means of the travel distance (S). In section I the values of a stand of grain (B) in the course of a lane beyond a fertility boundary (G1) are shown, as well as a measured yield signal (EM) obtained therefrom by a combine. The location with the path coordinate (KS) at which the measuring signal jump occurs because of the fertility jump, is located beyond the location of the fertility boundary (G1) having the true coordinates (KSW) by the distance S (DT, VI), which results from the passage time constant (DT) of the grain through the combine and from the actual speed (VI). For this reason the storage of the measured value is performed in relation to the true coordinate (KSW).

The evaluation of the yield amount jump stored under the true coordinate (KSW) is shown in Section II, namely in relation to a regulation of the speed of the combine which is continuously signaled and displayed as the actual speed (VI). So that the actual speed (VI) is already reduced when the combine arrives at the fertility boundary (G1) and the increased grain amount therefore does not jam the combine, the speed change has already been initiated at a previous coordinate (SS1), which is located ahead of the target location (KS1) at the fertility boundary by a distance S (EZ1, VI) which results from a setting constant (EZ1) of the speed to be changed and the actual traveling speed (VI). In this case the fact must be taken into consideration that the speed itself changes during the change and that therefore the distance results in an integral.

Another pattern of a stand (BB) beyond the fertility boundary (G1) is shown in Section III, along with the actual machine load (MLI) which occurs in connection with a defined slowing of the throughput, in particular at the conveyor path at the input. This retardation (DT*), together with the speed (VI), results in the path offset up to the measuring location with the coordinates (KS*). The load jump is again stored in relation to the true coordinates (KSW), offset by this amount.

The cutting height (SH) is shown in section IV, which results when the cutting height setting is initiated at a prepositioned coordinate location (SS1*), so that it is ended after a set-point time constant (EZ1*) at a speed (VI) when the fertility boundary of the denser stand has been reached.

The time constants have been taken into consideration ahead of the fertility boundary because in the denser stand which follows it the new machine setting should already be in effect in order to obtain improved safety from overload or damage to the mowing unit. In the lower sections V to VIII of the figure, travel through a fertility boundary (G2) is performed in which a strong reduction of the yield (EM) and a reduction of the load (MLI) takes place. Here, too, a respective passage time (DT, DT*) of the crop and the corn as well as the distance S (DT, VI). S (DT*, VI) traveled in the course of this must be taken into consideration for storing the measured data in relation to the true location coordinates (KSW).

In the course of the subsequent utilization of these data, the appropriate set-point change is respectively performed at the location of the fertility boundary (SS2, SS2*), so that there will be no increase in speed and no lowering of the cutting height in the dense stand, by means of which an overload or cutting unit damage is avoided. The change of the speed (VI) and the cutting height (SH) is again performed with the associated time constants (EZ1, EZ1*) which, however, is not critical, since the operation in the less dense stand is not dangerous.

Figure 6:
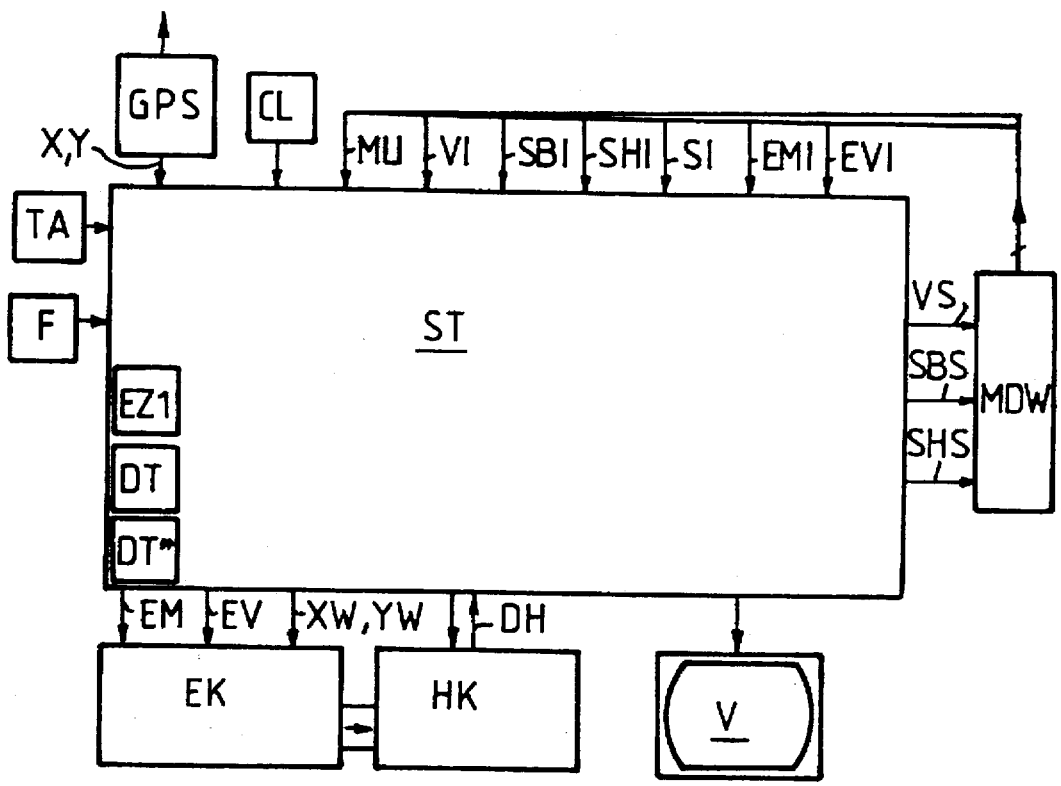
FIG. 6 shows a block diagram of the entire device.

FIG. 6 shows a block diagram of the control device (ST). This is provided with coordinates (X, Y) by a locating device (GPS) and with time information by a clock (CL). The control device (ST) feeds the combine unit (MDW) with set-point operating signals (VS, SBS, SHS), and receives actual signals (MLI, VI, SBI, SHI, SI, EMI, EVI) from it in turn. In addition, the operator provides operating control signals via the keypad (TA) and the control stick (F) to the control device (ST). Numerous operating parameters are stored therein, in particular the setting time constants (EZ1, EZ1*) and the passage times (DT, DT*). From these data the control device (ST) determines operating data (EM, EV) for the true coordinates, in particular specific measured yield data and loss data, which are stored in the harvest register respectively associated with the true coordinates. When these data are used again, they are in the historical data register (HK) and are transferred, supplied with search coordinates addressed as historical data (DH), to the control device for further processing. In accordance with what has been described above, set-point operating data for optimal operation are determined from them and are either directly supplied to the combine unit (MDW) or visually presented on a display screen (V) to the operator.

Figure 7:
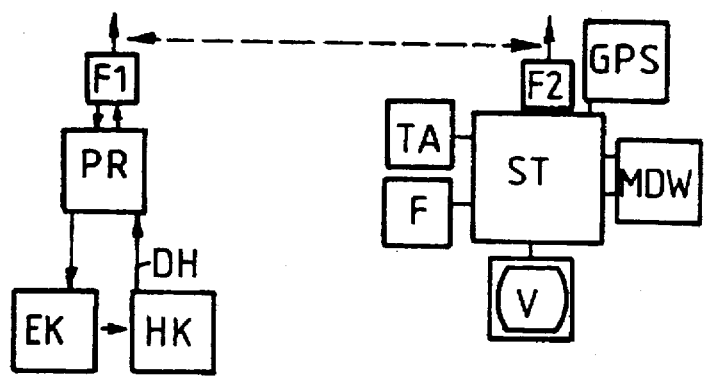
FIG. 7 shows a block diagram of a device with a radio link.

FIG. 7 represents a changed device, wherein partial functions are performed in a separate, in particular stationary, processor (PR), which serves the register memory (EK) as well as the historical register (HK), and which transmits the historical data (DH) to the control device (ST) of the combine via a radio link. The latter in turn transmits the actual operating data as well as the coordinate data determined by the locating device (GPS) to the processor (PR) via the radio link. This system has the advantage that several combines can work together with one register station by radio and that therefore several combines can operate directly using the respective data of a preceding combine harvesting an adjoining lane. It is of course also possible for the device containing the register memory to be disposed itself on a combine and to communicate from there with several combines.

I claim:

1. A method for an operator to operate a combine to optimize harvesting output, comprising the steps of:

providing a control processor (ST) containing set-point and limit operating data;

providing means for continuous measuring and evaluation of actual operating data (VI, SBI, SHI);

continuously detecting location coordinates (X, Y) of the combine and assigning the location coordinates (X, Y) to respective area-specific yield measuring data (EM);

storing the area-specific yield measuring data in a yield data register (EK) to be used as a historical data register (HK);

prior to arrival of the combine at an actual location having actual location coordinates, providing the control processor (ST) of the combine with access to the historical data register (HK) and historical data (DH) stored therein, with the respective location coordinates (X, Y) of the combine, and with the actual operating data (VI, SBI, SHI); and determining and specifying fresh set-point limit operating data (VS, SBS, SHS).

2. A The method in accordance with claim 1, including steps of continuously measuring an actual traveling speed (VI), an actual cutting width (SBI) and an actual yield amount (EMI) as the actual operating data and registering therefrom respectively the area-specific measured yield data (EM) in relation to previous coordinates, determined from current coordinates (X, Y; KS, KE), and the actual traveling speed (VI) in connection with a crop passage time (DT) and at a same location with same-location coordinates (XW, YW; KSW, KEW) reading out from the historical register (HK) respectively the historical data (DH) regarding future coordinates (XK1, YK1; KS1) of the combine, which it will have reached by means of the respective traveling speed after a setting time constant (EZ1) of a respective associated machine load regulating operation, and determining therefrom the set-point speed (VS) and the set-point cutting width (SBS) and the set-point cutting height (SHS) such that as like as possible a machine load occurs when traveling through the future coordinates (XK1, YK1; KS1) and an overload or machine damage are avoided.

3. The method in accordance with claim 2, including steps of measuring and registering current harvest losses (EVI) area-specifically in respect to the true coordinates (XW, XY; KSW, KEW) and determining therefrom during subsequent harvesting at the same location (XW, YW), the set-point speed (VS) and the set-point cutting width (SBS) and the set-point cutting height (SHS) in respect the future coordinates (XK1, YK1; KS1, KE1) such that as small as possible an area-specific harvest loss occurs after traveling through the future coordinates (XK1, YK1; KS1, KE1).

4. The method in accordance with claim 2, including a step of area-specifically registering, as actual operating data, a measured actual machine load (MLI) relative to the true coordinates (XW, XY; KSW, KEW), determined from the current coordinates (X, Y; KS, KE) and the actual traveling speed (VI) in connection with a crop passage time (ET) up to the load measurement, and reading therefrom subsequently at the same location with the coordinates (XW, XY; KSW, KEW), the respective historical data (DH) relating to future coordinates (XK1, YK1) of the combine, which it will have reached by means of the respective traveling speed (VI) in accordance with a setting time constant (EZ1) of a respective machine load regulating operation, and the set-point speed (VS) and the set-point cutting width (SBS) and the set-point cutting height (SHS) are determined therefrom in such as way that a closely similar machine load occurs when traveling through the future coordinates (XK1, YK1; KS1, KE1).

5. The method in accordance with claim 1, including a step of linking the registered historical data (DH) with year-specific data of a respective crop or respective effects of the weather, prior to their evaluation with specified starting set-point operating data.

6. The method in accordance with claim 1, including a step of evaluating the registered data (DH) of one or several harvest lanes (E1, E2) which adjoin the harvest lane (E3) to be harvested, by a coordinate extrapolation of the current path coordinates (KS; X, Y) of the combine on the adjoining coordinates (K3S, E3; XB1, YB1; XB2, YB2) and directly utilizing the registered data for determining the set-point or limit operating data (VS, SBS, SHS).

7. The method in accordance with claim 6, including a step of evaluating the registered data (DH) of the respectively adjoining harvest lanes (E1, E2) relating to the current coordinates (KS, E3; X, Y) of the combine, offsets (V1, V2) in respectively an area located ahead or behind occurring in or opposite a direction (SR) of the lanes (E1, E2) from respectively like changes of the data (DH) in accordance with the offsets (V1, V2) being extrapolated on the current coordinates (KS, E3; X, Y), for determining the set-point or limit operating data (VS, SBS, SHS).

8. The method in accordance with claim 1, including a step of directly supplying the set-point or limit operating data (VS, SBS, SHS) determined from the registered data (DH) respectively to a set-point input of an associated regulator.

9. The method in accordance with claim 8, including a step of displaying respectively specifically formed set-point or limit operating data (VS, SBS, SHS) next to the respective associated actual operating values (VI, SHI, SBI) and respective set-point and limit values (S11, S12) specified by the operator on the control station display screen (V).

10. The method in accordance with claim 6, including a step of determining the relative location coordinates as direction oriented path coordinates (KE, KS) in relation to corresponding lane starting positions (EA1, EA2, EA3) in the individual harvest lanes (E1, E2, E3) by means of a continuous travel measurement from actual measured path data (WI).

11. The method in accordance with claim 1, including a step of determining the absolute location coordinates (X, Y) of the combine by a satellite radio locating device (GPS, DGPS) and performing continuous travel measurements and a transformation into direction of travel oriented path coordinates (KS, KE) and vice versa when the registration data are read in or stored.

12. The method in accordance with claim 1, including a step of continuously monitoring the data to be registered to determine whether at least one part of last stored, associated data exceeds a specified relative or absolute amount in either direction, and thereafter storing the respective data with their true coordinates (KEW, KSW; XW, YW).

13. The method in accordance with claim 1, including a step of respectively supplying the set-point operating values (VS, SBS, SHS) determined from the registered data (DH) in the form of an overriding control loop to the operating controllers of the combine, which operate as subordinate controllers.

14. The method in accordance with claim 11, including a step of performing the location determination and the register data processing and provision by means of a stationary processor (PR) and a locating device (GPS) on the combine, and continuously transmitting the respective location coordinates (X, Y) are transmitted by the locating device to the stationary processor (PR) and the respectively determined historical data (DH) by radio to the combine.

15. The device for executing the methods in accordance with any one of claims 1 to 13, including a step of providing locating means (GPS), speed measuring means and a register memory (HK), whose store operating data (DH) are processed by means of the control processor (ST), containing a program in accordance with the method, into set-point and limit operating data (VS, SBS, SHS), which are supplied to operating controllers and shown on a display screen (V).

16. A device for executing the method in accordance with claim 14, including a stationary processor (PR) which includes means to access a register memory (HK) and contains a program which processes the register data (DH) and contains a radio transmitter (F1), which communicates with another radio transmitter (F2) installed in a combine, and continuously receives from it the cutting communicates with another radio transmitter (F2) installed in a combine, and continuously receives from it the cutting widths and speed and path measurement data (SBI, VI, WI) as well as the location coordinates, from a location determination device (GPS) and transmits the historical data (HD) and the determined set-point and limit operating data (VS, SBS, SHS) to the combine for forwarding to the control and regulating device (ST) of the combine.

17. The method in accordance with claim 1, including a step of visually showing the set-point or limit operating data (VS, SBS, SHS) determined from the registered data (DH) on a control station display screen (V) or display.

* * * * *